Patented Apr. 14, 1953

2,635,066

UNITED STATES PATENT OFFICE 2,635,066

METHOD OF PRODUCING PLYWOOD

John G. Meiler, Coos Bay, Oreg., Earl G. Hallonquist, Vancouver, British Columbia, Canada, and Robert J. Hilton, Seattle, Wash., assignors to Plywood Research Foundation, Tacoma, Wash., a nonprofit corporation of Washington No Drawing. Application November 21, 1949,
Serial No. 128,675

5 Claims. (Cl. 154—133)

The present invention relates to thermosetting adhesive compositions useful for joining layers of material to form a laminated product, particularly for joining wood veneers in the manufacture of plywood.

This application is a continuation-in-part of our copending patent application, Serial Number 57,416, filed October 29, 1948, for Extended Thermosetting Adhesive Compositions, and the Method of Employing the Same in Producing Plywood, and which has become abandoned.

In the production of plywood and other articles made by gluing together adjacent surfaces of absorbent material such as wood, there are presented the two primary problems of preventing the soaking in of the adhesive employed into the base material before it sets to form the bond, and of controlling the moisture content of the adhesive so that extensive quantities of steam are not generated during the pressing operation by which the adhesive is set, with resulting blowing out and blistering of the product. The first of these two problems is of particular importance since, in many operations, a substantial period of time elapses between the application of the adhesive to the surfaces to be joined and the bonding operation. This is particularly true in the plywood industry where a number of panels are assembled prior to their introduction into the press. Hence it is of great importance in the plywood industry that the adhesive employed should have a long assembly time.

The second of the above problems, i. e., the control of the moisture content of the adhesive, also is of the greatest importance in the plywood industry. Since the thermosetting adhesives employed have an aqueous base, and since the wood veneers, themselves, often have a substantial moisture content, there is a large amount of steam necessarily generated in the hot pressing operation which, if not properly dissipated, will result in blowing out and blistering of the panels. This problem is complicated by the fact that the phenol-aldehyde resins and other resins often used as bases for plywood adhesive mixtures are expensive, and as a consequence it would be desirable to dilute or extend them with as much water as possible. However, the amount of water which may be added for this purpose is greatly limited by the increased tendency toward blowing and blistering induced by its presence in large amounts. With present day commercial formulations, very substantial problems exist regarding blowing and blistering because of the amounts of water or moisture present during pressing.

We have discovered that the foregoing problems may be overcome in substantial degree by the use of laminating adhesive compositions broadly comprising aqueous emulsions of the thermosetting phenol-aldehyde resins soluble in aqueous alkaline media, and of water insoluble distillable oils which are liquid at normal atmospheric pressures and temperatures and which have boiling points at normal atmospheric pressures above 260° F., particularly the petroleum hydrocarbon oils and related products having viscosities at least as high as diesel oil. When such emulsions are applied to the surfaces of wood veneers the resin content thereof remains on such surfaces for long periods of time without substantially penetrating into the wood and hence provide adhesive compositions having desirably long assembly times. Furthermore, the oily components of the adhesive composition may be used in substantial amounts, thereby reducing the amount of water which is present in the composition and hence reducing correspondingly the tendency of panels utilizing the same to blow and blister. The adhesive compositions of the invention may, in fact, be stated to be practically free from this disadvantageous property under the usual conditions of plywood fabrication. In addition, the adhesive compositions of our invention are characterized by the following desirable properties:

1. They are stable over substantial periods of time and do not tend to settle out or change in viscosity during reasonable storage and use.

2. There is no interaction between the oil and the phenol-aldehyde resin so that their storage life is not essentially different from that of heretofore conventional phenol-aldehyde resinous mixtures.

3. They have a good body and are readily adaptable to being spread on veneer surfaces with glue spreaders of conventional construction.

4. Certain of the oils, e. g., the hydrocarbon oils, have electrical insulating properties and render the adhesive mixtures containing them highly arc resistant when placed in a high frequency electrical field. They thus enable the utilization of phenol-formaldehyde resins, which of themselves have low arc resistance, in the formulation of adhesive mixtures well adapted for use in the commonly employed processes of manufacturing plywood employing high frequency heating.

5. They have normal pot life.

6. Plywood panels made using them come out of the press relatively flat and demonstrate less tendency to warp when stored and used under humid conditions.

The oils which may be employed in formulating the presently described adhesive compositions broadly comprise those oils which are emulsifiable with aqueous solutions, which are distillable, which are liquid at normal atmospheric pressures and temperatures, and which have boiling points at normal atmospheric pressures above 260° F. Illustrative of such oils are the hydrocarbon oils both paraffinic and aromatic, saturated and unsaturated, and including the chlorinated and other derivatives of these hydrocarbon materials. Specifically excluded from the scope of the invention, however, are the non-distillable hydrocarbon materials including the asphalts, the bitumens, the pitches, and liquids containing appreciable quantities of these materials. The asphaltic and related materials are not suitable for the present purpose since they do not form satisfactory emulsions with the other components of the adhesive mixtures.

Particularly well suited for the purposes of the present invention are the oils having relatively high flash points which may be used with relative freedom from fire hazard. Such oils are exemplified by the lubricating oil fractions obtained by the fractionation of crude oil. The oils which may be used in this invention also include diesel oil. They include reclaimed lubricating oil (i. e., lubricating oils which have been used and subsequently subjected to refining procedures for the removal of volatile materials, acids, sludge, solids, etc.); hydrocarbon fractions obtained by the fractionation of crude oil similar to lubricating oil, but otherwise designated and designed for other uses; hydrocarbon extracts having flash points and viscosities similar to those of lubricating oils and obtained by the solvent extraction of various petroleum fractions during the refining procedure, as by the extraction of lubricating oil stock with furfural; and resins and polymers having flash points and viscosities similar to lubricating oils and formed during the cracking and refining of petroleum and subsequently isolated, or manufactured in a separate operation, as by the catalytic treatment of olefines. All of these materials are characterized by being relatively non-volatile and by being intimately compatible with the other constituents of the adhesive composition and emulsifiable with the aqueous base.

Typical of such hydrocarbon products are those whose properties are given in Table I wherein the abbreviations "C. O. C.," "S. S. U." and "A. P. I." denote, respectively, Cleveland Open Cup," "Saybolt Seconds Universal," and "American Petroleum Institute," these referring to standard test methods for determining the properties indicated.

phenol and the substituted furfurals, the xylenols and formaldehyde, resorcinol and formaldehyde and the like. These various condensation products preferably are employed in the form of their aqueous alkaline solutions and may be used singly or in admixture with each other. They are typified by the water miscible, phenol-formaldehyde resinous condensation products manufactured and marketed under the trade-names "Lauxite PF4X," "Plyophen P398" and "Amres #580," these being sold and used in the form of aqueous alkaline solutions containing from about 30% to about 50% by weight resins and caustic solids, of which about 3 to 8% may be caustic. It is to be noted that the alkali present in these solutions has the desirable effect of promoting or aiding emulsification of the oils and the resins. Such alkali may be included in the formulae by employing aqueous alkaline resin solutions or by the addition of caustic solutions, as such, or a combination thereof.

In formulating the hereindescribed adhesive compositions, there may also be used, in conjunction with the phenol-aldehyde resin and the hydrocarbon oils, suitable proportions of the protein modified phenolic adhesives and the protein adhesives, such as those which include blood, soya bean, casein, or the like; powdered ligno-cellulose materials, such as walnut shell flour and wood flour; inert powdered mineral oxides, such as zinc oxide, aluminum oxide and ferric oxide; and emulsion stabilizers, such as casein or carboxymethyl cellulose.

The relative proportions of the primary constituents of the thermosetting adhesive compositions of the invention, i. e., the phenol-aldehyde resin and the oils, are somewhat variable depending upon the particular application of the adhesive. In general, the addition of any amount of oil is desirable up to the point where further dilution of the phenol-aldehyde resin forms a mixture which no longer has the necessary adhesive qualities. The broad limits of oil use thus lie between about 0.25 and about 10.0 parts by weight per unit weight of solid phenol-aldehyde resin. When

TABLE I

| | 1—Lubricating Oil [a] | 2—Reclaimed Lubricating Oil [b] | 3—Cylinder Oil [c] | 4—Lubricating Oil Extract [d] | 5—Petroleum Resin [e] | 6—Diesel Oil |
|---|---|---|---|---|---|---|
| Flash Point (C. O. C.) ° F | 420 | 270 | 610 | 365 | 230 | 165 |
| Fire Point (C. O. C.) ° F | | 355 | | | | |
| Specific Gravity | | 0.8822 | 0.9071 | 1.007 | 1.0–1.02 | 0.8681 |
| Viscosity (S. S. U. @ 100° F.) | | 208 | 4,727 | 732 | 100–300 | 38.2 |
| Viscosity (S. S. U. @ 200 ° F.) | 67 | | 235 | 49.6 | | |
| Gravity (A. P. I.) | 30.7 | 28.9 | 24.5 | | | 31.5 |
| Initial Boiling Point ° F | | | | 560 | 464 | 388 |
| Iodine Number | | | | | 190–200 | |
| Bromine Number | | | | 30.7 | | |

[a] An unrefined lubricating oil stock containing about 30% by weight wax and marketed under the trade-name "PD893–F Oil."
[b] Dehydrated and desludged crank case drainings, topped to remove light fractions, and sold as "Reclaimed Oil."
[c] A naphthenic base cylinder oil marketed as "Gargoyle Super Cylinder Oil."
[d] A furfural extract of lubricating oil stock from Western crude, high in aromatics, marketed as "GPD 357 Oil."
[e] An aromatic-type olefinic hydrocarbon resin manufactured by the catalytic treatment of unsaturates obtained as by-products in the vapor phase cracking of mineral oil. This is marketed as "CTLA Polymer."

The phenol-aldehyde resinous condensation product which may be used together with the foregoing oils in the formulation of the thermosetting adhesive compositions of the present invention comprise the broad class of resins formed by condensing a phenol and an aldehyde in the presence of a suitable catalyst and characterized by being soluble in aqueous alkaline media. They include, for example, the condensation products of phenol and formaldehyde, phenol and furfural, preparing an adhesive suitable for use in the manufacture of plywood in the ordinary operation, from about 0.5 to about 4.0 parts of oil for each part by weight of phenol-aldehyde resin (solid basis) is preferred. Typical formulations for such adhesive mixtures are given in parts by weight in Table II for interior and exterior types of plywood. Such types are described in "Douglas Fir Plywood, Commercial Standards—CS 45–47" of the United States Department of Commerce.

TABLE II

|  | 1—Interior Type | 2—Interior Type | 3—Exterior Type |
|---|---|---|---|
| Oil (Petroleum Hydrocarbon) | 130–140 | 120–140 | 115–125 |
| Solid Filler | 25–35 | 40–60 | 25–35 |
| Aqueous Alkaline Phenolaldehyde Resin (40% Solids) | 200–220 | 200–220 | 300–320 |
| Water | 75–95 | 65–85 | 30–45 |
| NaOH (50% aqueous solution) | | 30–40 | |

In general, adhesive compositions of this invention may be prepared by first mixing together the oil and the walnut shell flour or other solid extender or filler. The liquid alkaline phenolaldehyde resin is then added, after which is added a suitable stabilizer (e. g., 6 parts of casein, 30 parts of water, and 1 part of 50% sodium hydroxide premixed), if a stabilizer is used. The resulting mixture is thoroughly stirred for about five minutes, after which the water is added with continued stirring. This results in the formation of a suitable emulsion ready for use, although it may be desirable in some cases to pass the composition through a high speed mixer or colloid mill.

The adhesive emulsion prepared as described above may be applied to the surfaces of the wood veneers or other pieces of material to be glued together using a spread of about 45 to 60 pounds of adhesive per 1000 square feet of double glue line, this being substantially the conventional spread of adhesive in the manufacture of resin-bonded plywood. The laminated product then may be laid up and pressed in usual manners and under usual pressing conditions, e. g., in a hot press of conventional construction at pressures of from about 150 to 250 pounds per square inch, temperatures of about 130°–160° C., and for press times ranging from about 2 minutes to about 20 minutes, depending on the type, thickness and moisture content of veneer, number of plys, and panels per press opening.

The adhesive compositions of the invention and their application to the manufacture of interior type and exterior type plywood are illustrated by the data given in Tables III and IV. In all cases, the compositions were prepared in the manner described above and then applied to Douglas fir wood veneers with a conventional plywood glue spreader. The plywood was laid up and hot pressed, the spreads, closed assembly times and pressing conditions being as indicated in the tables. The resulting plywood products were evaluated by subjecting them to the standard wet and dry shear and wood failure tests outlined in Commercial Standard CS45–47 of the Commodity Standards Division of the National Bureau of Standards as well as by the standard 10 cycle soak test specified by the Douglas Fir Plywood Association. The results were as given in Tables III and IV, each test value being an average of about 60 individual testing operations.

For purposes of comparison, the results obtained by testing the plywood samples prepared using the adhesive compositions of the present invention were compared with those obtained using a conventional interior mix having the following composition:

| | Parts by weight |
|---|---|
| Water | 275 |
| Sodium carbonate | 40 |
| Sodium hydroxide (50% solution) | 60 |
| Walnut shell flour | 175 |
| Phenol formaldehyde resin | 500 |

This conventional adhesive was prepared by first heating the solution of sodium carbonate and sodium hydroxide in water to 200° F. The walnut shell flour then was added and the mixture agitated for 15 minutes, maintaining the temperature at 180 to 200° F. The mixture next was cooled to 140° F. and half the phenol formaldehyde resin added with agitation for 5 minutes. The remaining phenol formaldehyde resin then was added and the agitation continued for 5 minutes.

TABLE III
*Interior mixes*

| Example | 1 | 2 | 3 | 4 | 5 | Typical Conventional Interior Mix |
|---|---|---|---|---|---|---|
| Adhesive Formulations (in percent by weight): | | | | | | |
| Petroleum Hydrocarbon | a 400 | b 250 | c 136 | c 105 | d 136 | |
| Walnut Shell Flour | 48 | 88 | 30 | 60 | 30 | |
| Zinc Oxide | | 100 | | | | |
| Phenol Formaldehyde Resin (40% Solids) | 300 | 300 | 212 | 212 | 212 | |
| Casein ⎫ | | | 6 | 6 | 6 | |
| Water ⎬ Premix | | | 30 | 30 | 30 | |
| 50% NaOH ⎭ | | | 1 | 1 | 1 | |
| Water | 148 | 198 | 85 | 86 | 85 | |
| Percent by weight Resin Solids | 13.4 | 12.8 | 17.0 | 17.0 | 17.0 | 19.0 |
| Percent by weight Total Water in Mix | 36.6 | 40.4 | 48.5 | 48.7 | 48.5 | 57.5 |
| Spreading Conditions: | | | | | | |
| Thickness of veneer (in.) | ⅛ | ⅛ | ⅛ | ⅛ | ⅛ | 1/10 |
| Spread (lbs. per 1,000 sq. ft. of double glue line) | 50 | 50 | 50 | 50 | 50 | 52 |
| Closed Assembly Time (Min.) | 5 | 5 | 5 | 5 | 5 | 5 |
| Pressing Conditions: | | | | | | |
| Panels per Opening | 1 | 1 | 2 | 2 | 2 | 2 |
| Time (Min.) | 5 | 5 | 6 | 6 | 6 | 5 |
| Temperature, °C | 150 | 150 | 140 | 140 | 140 | 140 |
| Pressure, p. s. i. | 200 | 200 | 200 | 200 | 200 | 200 |
| Test Values: Shear Strength (p. s. i.)— | | | | | | |
| Wet | 172 | 189 | 172 | 143 | 168 | 179 |
| Dry | 240 | 256 | 215 | 221 | 216 | 226 |
| Wood Failure (Percent): | | | | | | |
| Wet | 71 | 81 | 65 | 84 | 97 | 72 |
| Dry | 86 | 91 | 77 | 91 | 94 | 92 | a Lubricating oil furfural extract; cf. Table I, column 4, for properties.
b Petroleum resin having the properties given in Table I, column 5.
c Reclaimed lubricating oil having properties as given in Table I, column 2.
d Diesel oil having properties as given in Table I, column 6.

TABLE IV

*Exterior mixes*

| Example | 6 | 7 | 8 | Typical Conventional Exterior Mix |
|---|---|---|---|---|
| Adhesive Formulations (in percent by weight): | | | | |
| Petroleum Hydrocarbon | a 120 | a 120 | a 120 | |
| Walnut Shell Flour | 30 | 30 | 30 | 71.5 |
| Phenol Formaldehyde Resin (40% Solids) | 312 | 312 | 312 | 357 |
| Water | 38 | 38 | 38 | 71.5 |
| Percent by weight Resin Solids | 25 | 25 | 25 | 28.6 |
| Percent by weight Total Water in Mix | 45 | 45 | 45 | 57 |
| Spreading Conditions: | | | | |
| Thickness of veneer (in.) | ⅛ | ⅛ | ⅛ | ¹⁄₁₀ |
| Spread (lbs. per 1,000 sq. ft. of double glue line) | 57 | 57 | 57 | 57 |
| Closed Assembly Time (Min.) | 5 | 15 | 30 | 5 |
| Pressing Conditions: | | | | |
| Panels per Opening | 2 | 2 | 2 | 2 |
| Time (Min.) | 6 | 6 | 6 | 5 |
| Temperature, °C | 140 | 140 | 140 | 150 |
| Pressure, p. s. i. | 200 | 200 | 200 | 200 |
| Test Values: Shear Strength (p. s. i.)—Wet | 161 | 149 | 135 | 151 |
| Wood Failure (Percent): Wet | 91 | 98 | 95 | 96 | a Reclaimed lubricating oil having properties given in Table I, column 2.

In a manner similar to that described in the above examples, plywood is made using oil emulsions incorporating in place of the phenol-formaldehyde resins of the examples xylenol-formaldehyde resins, alkylated phenol-formaldehyde resins, resorcinol-formaldehyde resins, phenol-furfural resins, or mixtures thereof.

It will be observed from an examination of the foregoing examples that the total water content of the presently described adhesive compositions is substantially lower than that of the conventional compositions. Thus whereas the latter contain about 58% water, the compositions of our invention contain only from about 36 to about 48% water. This low water content imparts to the compositions the important advantage noted hereinabove of rendering the plywood fabricating operation substantially free of problems of blowing and blistering of the panels. In addition, the panels come out of the presses flat and unwarped, and tend to remain so during storage and use. Furthermore, the character of the compositions is such that the resin content thereof remains on the surface of the panels during the assembling operation for relatively long periods of time. These important advantages are obtained, furthermore, without increasing the cost of the adhesives (in most instances cost is reduced because of lower resin required), without complicating the plywood manufacturing operation by requiring the use of special machinery or otherwise, and while maintaining the required high standard of strength and water resistance specified for plywood products.

Having now described our invention in preferred embodiments, we claim:

1. The method of joining together plies of wood which comprises applying to one of the two surfaces of the plies to be adhesively joined together, a thermosetting adhesive aqueous oil emulsion composition for adhesively joining together plies of wood comprising a thermosetting phenol-aldehyde resin dissolved in an aqueous alkaline medium, the same containing from about 30% to about 50% by weight resin and caustic solids, of which 3 to 8% are caustic; and a petroleum distillable hydrocarbon oil, forming an emulsion with said resin aqueous alkaline medium, having a flash point and a viscosity similar to those of lubricating oils and remaining liquid at normal atmospheric pressures and temperatures, said oil being present between about 0.5 part and about 4 parts by weight per unit weight of solid phenol-aldehyde resin in the aqueous resin solution, said emulsion tending to remain on the surface of the wood and not to substantially penetrate the same pending application of setting and curing temperatures and pressures of the emulsion; superimposing the other of said pieces on the piece to which the said composition has been applied to form an assembly; and heating and pressing the assembly to cure the resin and form an adhesive bond with pressures and temperatures in the order of about 130° C.–160° C. and of about 150–250 p. s. i.

2. The method of claim 1 wherein the hydrocarbon oil comprises an aromatic-type olefinic hydrocarbon resulting from the catalytic polymerization of unsaturated hydrocarbons produced during the vapor phase cracking of petroleum.

3. The method of claim 1 wherein the hydrocarbon oil is a furfural extract of lubricating oil stock.

4. The method of joining together plies of wood which comprises applying to one of the two surfaces of the plies to be adhesively joined together, a thermosetting adhesive aqueous-oil emulsion composition for adhesively joining together plies of wood comprising a thermosetting phenol-aldehyde resin dissolved in an aqueous alkaline medium the same containing from about 30% to about 50% by weight resin and caustic solids, of which 3 to 8% are caustic, and a petroleum distillable hydrocarbon oil, forming an emulsion with said resin aqueous alkaline medium, having a flash point and a viscosity similar to those of lubricating oils and remaining liquid at normal atmospheric pressures and temperatures, said oil being present between about 0.5 part and about 4 parts by weight per unit weight of solid phenol-aldehyde resin in the aqueous resin solution, said emulsion tending to remain on the surface of the wood and not to substantially penetrate the same pending application of setting and curing temperatures and pressures of the emulsion; superimposing the other of said pieces on the piece to which the said composition has been applied to form an assembly; and heating and pressing the assembly to cure the resin and form an adhesive bond with pressures and temperatures in the order of about 130° C.–160° C. and of about 150–250 p. s. i., the said adhesive aqueous-oil emulsion composition for hot press manufacture of interior type plywood having substantially the following composition:

| | Parts by weight |
|---|---|
| Aqueous alkaline phenol-formaldehyde resin (40% solids) | 200–220 |
| Petroleum hydrocarbon oil | 130–140 |
| Solid filler | 25–35 |
| Water | 75–95 |

5. The method of joining together plies of wood which comprises applying to one of the two surfaces of the plies to be adhesively joined together, a thermosetting adhesive aqueous-oil emulsion composition for adhesively joining together plies of wood comprising a thermosetting phenol-aldehyde resin dissolved in an aqueous alkaline medium the same containing from about 30% to about 50% by weight resin and caustic solids, of which 3 to 8% are caustic, and a petroleum distillable hydrocarbon oil, forming an emulsion with said resin aqueous alkaline medium, having a flash point and a viscosity similar to those of lubricating oils and remaining liquid at normal atmospheric pressures and temperatures, said oil being present between about 0.5 part and about 4 parts by weight per unit weight of solid phenol-aldehyde resin in the aqueous resin solution, said emulsion tending to remain on the surface of the wood and not to substantially penetrate the same pending application of setting and curing temperatures and pressures of the emulsion; superimposing the other of said pieces on the piece to which the said composition has been applied to form an assembly; and heating and pressing the assembly to cure the resin and form an adhesive bond with pressures and temperatures in the order of about 130° C.–160° C. and of about 150–250 p. s. i., the said adhesive aqueous-oil emulsion composition for hot press manufacture of exterior type plywood having substantially the following composition:

| | |
|---|---|
| Aqueous alkaline phenol-formaldehyde resin (40% solids) | 300–320 |
| Petroleum hydrocarbon oil | 115–125 |
| Solid filler | 25–35 |
| Water | 30–45 |

JOHN G. MEILER.
EARL G. HALLONQUIST
ROBERT J. HILTON.

References Cited in the file of this patent

UNITED STATES PATENTS

| Number | Name | Date |
|---|---|---|
| 2,068,759 | Nevin | Jan. 26, 1937 |
| 2,150,697 | Nevin | Mar. 14, 1939 |
| 2,150,698 | Nevin | Mar. 14, 1939 |
| 2,252,157 | Bergin et al. | Aug. 12, 1941 |
| 2,368,466 | Golick et al. | Jan. 30, 1945 |
| 2,449,451 | Cassen | Sept. 14, 1948 |

FOREIGN PATENTS

| Number | Country | Date |
|---|---|---|
| 384,728 | Great Britain | Dec. 15, 1932 |
| 417,948 | Great Britain | Oct. 16, 1934 |

OTHER REFERENCES

The Condensed Chemical Dictionary, 3rd Ed., published by Reinhold Publishing Co., N. Y., page 487.